(12) United States Patent
Sharma et al.

(10) Patent No.: US 8,965,372 B2
(45) Date of Patent: Feb. 24, 2015

(54) METHOD AND SYSTEM TO HANDLE A SIGNALING CONNECTION RELEASE PROCESS IN A WIRELESS COMMUNICATION SYSTEM

(75) Inventors: Neha Sharma, Bangalore (IN); Venkateswara Rao Manepalli, Bangalore (IN); Akhil Madan Panchabhai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 13/504,674

(22) PCT Filed: Aug. 26, 2010

(86) PCT No.: PCT/KR2010/005748
§ 371 (c)(1),
(2), (4) Date: Apr. 27, 2012

(87) PCT Pub. No.: WO2011/025284
PCT Pub. Date: Mar. 3, 2011

(65) Prior Publication Data
US 2012/0220299 A1 Aug. 30, 2012

(30) Foreign Application Priority Data
Aug. 26, 2009 (IN) .......................... 2035/CHE/2009

(51) Int. Cl.
*H04W 36/00* (2009.01)
*H04W 76/06* (2009.01)
*H04W 92/22* (2009.01)

(52) U.S. Cl.
CPC ............ *H04W 76/068* (2013.01); *H04W 92/22* (2013.01)
USPC ........................ 455/436; 455/437; 455/438

(58) Field of Classification Search
CPC .... H04W 76/068; H04W 36/08; H04W 36/10
USPC ................................................ 455/436–438
See application file for complete search history.

(56) References Cited

U.S. PATENT DOCUMENTS

| 6,845,095 B2* | 1/2005 | Krishnarajah et al. ........ 370/349 |
| 7,596,380 B2* | 9/2009 | Kim ........................... 455/452.1 |
| 8,638,711 B2* | 1/2014 | Patil et al. .................... 370/318 |
| 2006/0140159 A1 | 6/2006 | Choi et al. |
| 2008/0253312 A1 | 10/2008 | Park |
| 2009/0129339 A1 | 5/2009 | Young et al. |

FOREIGN PATENT DOCUMENTS

KR  10-2003-0022903 A  3/2003

* cited by examiner

*Primary Examiner* — Temica M Beamer
(74) *Attorney, Agent, or Firm* — Jefferson IP Law, LLP (57) ABSTRACT

A method and system for handling a signaling connection release process in a wireless communication system is provided. The method includes receiving a reconfiguration message by a mobile device. The method also includes triggering a serving radio network subsystem (SRNS) relocation process for the mobile device based on the receiving. Further, the method further includes causing a timer to cease running and resetting the timer to a predefined value. Moreover, the method includes clearing a variable associated with the timer from the mobile device. The system includes a mobile device, a radio network controller, and a communication interface.

32 Claims, 10 Drawing Sheets

METHOD AND SYSTEM TO HANDLE A SIGNALING CONNECTION RELEASE PROCESS IN A WIRELESS COMMUNICATION SYSTEM

TECHNICAL FIELD

The present disclosure relates generally to the field of wireless communication. More particularly, the present disclosure relates to a method and system for handling a signaling connection release process in a wireless communication system.

BACKGROUND ART

A signaling connection release indication (SCRI) message with cause was typically introduced to indicate a packet switched (PS) domain dormancy to a network and thereby to effect a transition of a mobile device to a battery efficient state. The PS domain dormancy includes disconnecting a connection between the network and the mobile device when no PS data exchange takes place. Transmission of the SCRI message is dependent upon a timer, for example a timer T323, which can be indicated in an information element (IE) present in radio resource control (RRC) signaling messages. In case of a serving radio network subsystem (SRNS) relocation process, the mobile device in a dedicated control channel (DCH) and a forward access channel (FACH) state incorrectly continues with a status and value of the timer until any modifications in the support or value of the timer is indicated in a universal mobile telecommunication system terrestrial radio access network (UTRAN) Mobility Information (UMI) message after moving from a first radio network controller (RNC) to a second RNC.

Fast dormancy feature is an optional feature for the network and is applicable from a release-8 version. If the second RNC does not support fast dormancy, the second RNC can still receive the SCRI with cause from the mobile device if the UMI is not sent to the mobile device resulting in mismatch of PS domain signaling connection status between the mobile device and the network. Another problem can occur when a timer value of the timer is changed due to the SRNS relocation process but the network has delayed to indicate the change of the timer value using the UMI. If the mobile device has initiated the SCRI message with cause, then the mobile device starts the timer using a previous timer value which is incorrect as the SCRI message with cause can increase a load at the network until the mobile device receives UMI with another timer value. If the successful transmission of SCRI message with cause is interrupted due to radio link control (RLC) re-establishment procedure, the SCRI message is lost. The RLC re-establishment procedure results when the mobile device moves from the first RNC to the second RNC. The RLC re-establishment procedure includes re-establishing the protocol layers by the mobile device. The mobile device further remains in a battery inefficient state as the timer is running which controls the mobile device from retransmitting the SCRI message with cause until the timer ceases and there are no PS data indications from upper layers.

DISCLOSURE OF INVENTION

Technical Problem

In the light of the foregoing discussion, there is a need for handling the SCRI message with cause during the SRNS relocation process and the RLC re-establishment procedure by handling the timer.

Solution to Problem

Embodiments of the present disclosure described herein provide a method and system of handling a signaling connection release process in a wireless communication system.

A method of handling a signaling connection release process in a wireless communication system includes receiving a reconfiguration message by a mobile device. The method also includes interpreting the reconfiguration message to effect a serving radio network subsystem (SRNS) relocation process for the mobile device from the presence and value of information element Universal Mobile Telecommunication System Terrestrial Radio Access Network (UTRAN) radio network temporary identifier (RNTI), U-RNTI, integrity protection mode information message, and downlink counter synchronization information message. Further, the method includes causing a timer to cease running. Moreover, the method includes resetting the timer to a predefined value. Further, the method includes clearing a variable associated with the timer from the mobile device. Moreover, the method includes the above modifications to the timer and the associated variable at the reception of the reconfiguration message, or at the transmission of the response to the reconfiguration message.

A method of handling a signaling connection release process in a wireless communication system includes receiving a reconfiguration message by a mobile device. The method also includes interpreting the reconfiguration message to effect a serving radio network subsystem (SRNS) relocation process for the mobile device from the presence and value of IE's new U-RNTI, integrity protection mode information message, and downlink counter synchronization information message. The method further includes allowing a timer to run based on the triggering. Further, the method includes clearing a variable associated with the timer from the mobile device. Moreover, the method includes the above modifications to the timer and the associated variable at the reception of the reconfiguration message, or at the transmission of the response to the reconfiguration message.

A method of handling a signaling connection release process in a wireless communication system includes transmitting a signaling connection release indication (SCRI) message with cause to a network by a mobile device. The method also includes receiving a reconfiguration message by the mobile device. The method further includes interpreting the reconfiguration message to effect a serving radio network subsystem (SRNS) relocation process for the mobile device from the presence and value of information element U-RNTI, integrity protection mode information message, and downlink counter synchronization information message. Further, the method includes causing a timer to cease running. Moreover, the method includes resetting the timer to a predefined value. Further the method includes clearing a variable associated with the timer from the mobile device. Moreover, the method includes the above modifications to the timer and the associated variable at the reception of the reconfiguration message, or at the transmission of the response to the reconfiguration message.

A method of handling a signaling connection release process in a wireless communication system includes receiving a reconfiguration message by a mobile device. The method also includes interpreting the reconfiguration message to effect a serving radio network subsystem (SRNS) relocation process for the mobile device from the presence and value of an information element U-RNTI, integrity protection mode information message, and downlink counter synchronization information message. The method further includes allowing a timer to run for a first timer value. Further, the method includes clearing a variable associated with the timer from the mobile device. Moreover, the method includes receiving a second timer value in an information message from a network. Further the method includes restarting the timer with a difference between the second timer value and the first timer value. Moreover, the method includes the above modifications to the timer and the associated variable at the reception of the reconfiguration message, or at the transmission of the response to the reconfiguration message.

A method of handling a signaling connection release process in a wireless communication system includes transmitting a signaling connection release indication (SCRI) message with cause to a network by a mobile device. The method also includes causing a timer to start running. The method further includes receiving a reconfiguration message by a mobile device to effect a radio link control (RLC) layer re-establishment at the mobile device. Further, the method includes causing a timer to cease running. Moreover, the method includes retransmitting the SCRI message with cause to the network by the mobile device upon successful re-establishment. Moreover, the method includes the above modifications to the timer and the associated variable at the reception of the reconfiguration message, or at the transmission of the response to the reconfiguration message.

A method of handling a signaling connection release process in a wireless communication system includes transmitting a signaling connection release indication (SCRI) message with cause to a network by a mobile device. The method also includes causing a timer to start running. The method further includes receiving a reconfiguration message by a mobile device to effect a radio link control (RLC) re-establishment at the mobile device. Further, the method includes allowing a timer to run for the timer value. The method also includes checking buffer occupancy for a packet switched domain on end of a timer value of a timer. Moreover, the method includes retransmitting the SCRI message with cause to the network if the buffer occupancy is at zero value. Moreover, the method includes the above modifications to the timer and the associated variable at the reception of the reconfiguration message, or at the transmission of the response to the reconfiguration message.

An example of a system for handling a signaling connection release process in a wireless communication system includes a mobile device comprising a processor responsive to a reconfiguration message to trigger a serving radio network subsystem (SRNS) relocation process, cause a timer to cease running based on the triggering, reset the timer to a predefined value, clear a variable associated with the timer from the mobile device. The system also includes a radio network controller to transmit a signaling connection release indication (SCRI) message with cause to a network. Further the system includes a communication interface in electronic communication with a network to send the SCRI message and receive the reconfiguration message.

Advantageous Effects of Invention

According to the present invention, the wireless communication system can handle the SCRI message with cause during the SRNS relocation process and the RLC re-establishment procedure by handling the timer.

BRIEF DESCRIPTION OF DRAWINGS

The accompanying figure, similar reference numerals may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various embodiments of the present disclosure.

MODE FOR THE INVENTION

It should be observed the method steps and system components have been represented by conventional symbols in the figure, showing only specific details which are relevant for an understanding of the present disclosure. Further, details may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for handling a signaling connection release indication (SCRI) message with cause during a serving radio network subsystem (SRNS) relocation process and a radio link control (RLC) re-establishment procedure by handling a timer, for example a timer T323.

Figure 1:
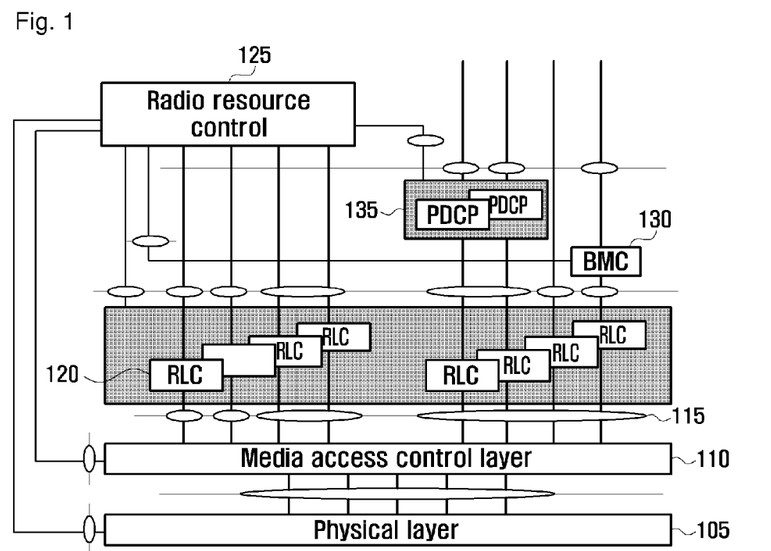
FIG. 1 illustrates a universal mobile telecommunication system (UMTS) radio interface protocol architecture layer, in accordance with which various embodiments can be implemented.

FIG. 1 illustrates a universal mobile telecommunication system (UMTS) radio interface protocol architecture, in accordance with which various embodiments can be implemented. The UMTS radio interface protocol architecture layer includes a physical layer 105, a media access control layer 110, a service access point (SAP) 115, a radio link control (RLC) layer 120, a radio resource control layer (RRC) 125, a broadcast-multicast control layer (BMC) 130 and a packet data convergence protocol layer (PDCP) 135. The SAP 115 is used for a peer-to-peer communication between the UMTS radio interface protocol architecture layers. The SAP 115 present between the MAC layer 110 and the physical layer 105 provides a transport channel. The SAP 115 between the RLC layer 120 and the MAC layer 110 provides a logical channel. Three RLC modes of operation include an unacknowledgement mode (UM), an acknowledgement mode (AM), and a transparent mode (TM). The PDCP layer 135 is accessed by a PDCP SAP and the BMC layer 130 is accessed by a BMC SAP. Service provided by the RLC layer 120 is referred to as a radio bearer. The radio bearer provided by the RLC layer 120 to the RRC layer 125 is denoted as a signaling radio bearer. There exists an RLC mode of operation in a mobile device and a corresponding RLC mode of operation at a network, for example a universal mobile telecommunication system terrestrial radio access network (UTRAN). The RLC mode of operation at the mobile device and the RLC mode of operation at the UTRAN includes receiving a payload from an upper layer by the RLC layer 120. The payload is referred to as a Service Data Unit (SDU).

The RLC layer 120 adds control information, referred to as header, for processing the SDU by an upper layer. The header combined with the SDU is referred to as a Protocol Data Unit (PDU). The AM RLC mode of operation includes a transmitter and a receiver. The transmitter of the AM RLC mode of operation transmits an RLC PDU and the receiver side of the AM RLC mode of operation receives the RLC PDU. The UM RLC mode of operation and the TM RLC mode of operation includes either the transmitter or the receiver. The RLC layer 120 is responsible for a reliable transmission of the SDU received from the upper layer. To achieve the reliability, a feedback process for intimating the transmitter about the reception of the PDU is employed by the receiver. An RLC re-establishment procedure is used for initialization of an upper RLC layer. The RLC re-establishment is performed by a mobile device upon request by the upper layer.

Figure 2:
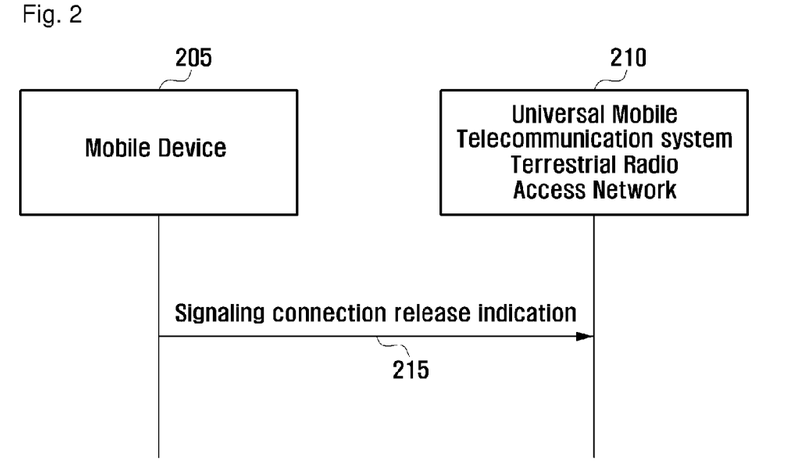
FIG. 2 illustrates a signaling connection release indication process, in accordance with a prior art.

FIG. 2 illustrates a signaling connection release indication process, in accordance with a prior art. For a release version prior to release-8 version, a signaling connection release indication (SCRI) process can be initiated without cause. The SCRI process without cause can be initiated if some malfunction occurs at a mobile device 205 and the mobile device wants to release the connection with a universal mobile telecommunication system terrestrial radio access network (UTRAN) 210. An SCRI message 215 is transmitted on a dedicated control channel (DCCH) using an acknowledgement mode (AM) radio link control (RLC) mode of operation. The procedure ends at mobile device 205 when the SCRI message 215 is delivered successfully to the UTRAN 210.

Figure 3:
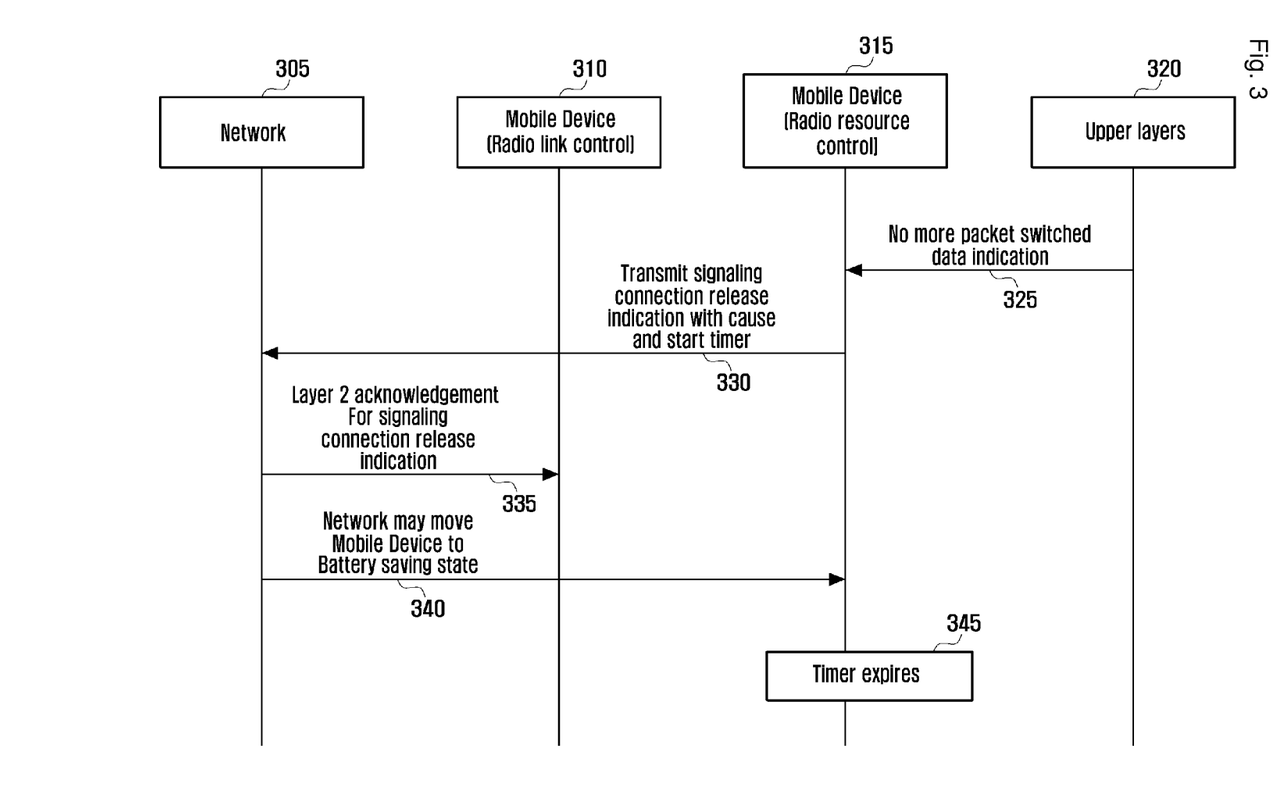
FIG. 3 illustrates a signalling connection release indication process with cause, in accordance with a prior art.

FIG. 3 illustrates a signaling connection release indication process with cause, in accordance with a prior art. If the UTRAN supports the SCRI process with cause, then it can initiate a state transition for the mobile device to a battery efficient state. The battery efficient states includes an idle state, a cell paging channel state, a UTRAN registration area (URA) paging channel state and a cell forward access channel state. Upper layers 320 indicate that there is no packet switched (PS) data present for transmission as shown in step 325. A radio resource control layer (RRC) 315 of the mobile device, on reception of the indication, transmits the SCRI with cause to the network, for example the UTRAN, and starts the timer as shown in step 330. The UTRAN, on reception of the SCRI with cause, transmits an acknowledgement, at step 335, for signaling connection release to a radio link control layer (RLC) 310 of the mobile device. The UTRAN makes a transition for the mobile device to a battery saving state as shown in step 340. The SCRI message with cause can lead to signaling load at the UTRAN, to reduce this load a timer 345 is introduced at the mobile device. If the timer 345 is running, the mobile device is prohibited from transmitting the SCRI message with cause. The timer then expires or ceases to run.

Figure 4:
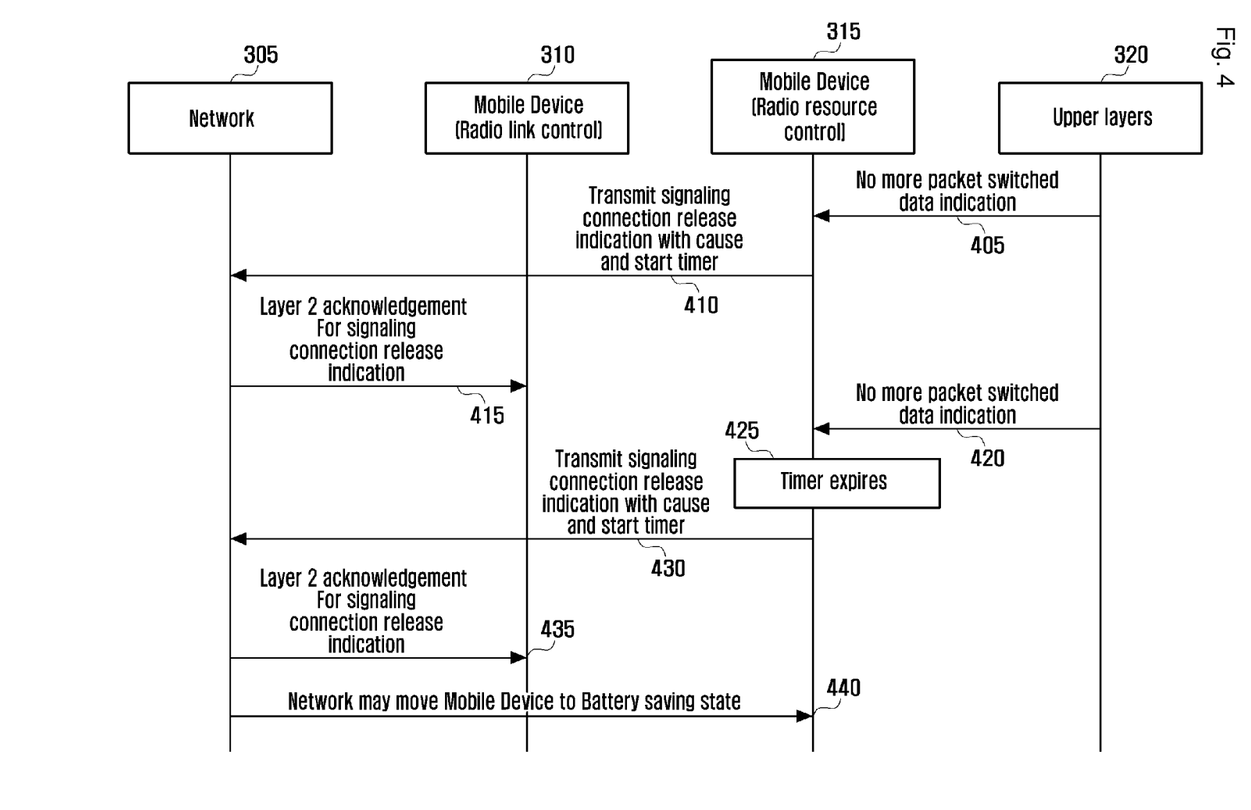
FIG. 4 illustrates a signalling connection release indication process with cause on cease of a timer, in accordance with one embodiment.

FIG. 4 illustrates a signalling connection release indication process with cause on cease of a timer. If the UTRAN supports the SCRI process with cause, then it can initiate a state transition for a mobile device to a battery efficient state. The battery efficient state includes an idle state, a cell paging channel state, a UTRAN registration area (URA) paging channel state and a cell forward access channel state. Upper layers 320 indicate that there is no packet switched (PS) data present for transmission as shown in step 405. A radio resource control layer (RRC) 315 of the mobile device, on reception of the indication, transmits the SCRI message with cause to the network, for example the UTRAN, and starts a timer, for example the timer T323, as shown in step 410.

The UTRAN, on reception of the SCRI message with cause, transmits an acknowledgement for signaling connection release at step 415 to a radio link control layer (RLC) 310 of the mobile device. The upper layers 320 sends a no more PS data indication at step 420, to the RRC 315 of the mobile device but as the timer is still running so the mobile device shall be inhibited from sending the SCRI message with cause. The timer expires as shown in step 425. The RRC 315 transmits the SCRI to the UTRAN at step 430 and starts the timer. The UTRAN transmits an acknowledgement at step 435 for signaling connection release to the RLC 310 of the mobile device. The UTRAN further makes a transition for the mobile device to a battery saving state as shown in step 440.

Figure 5:
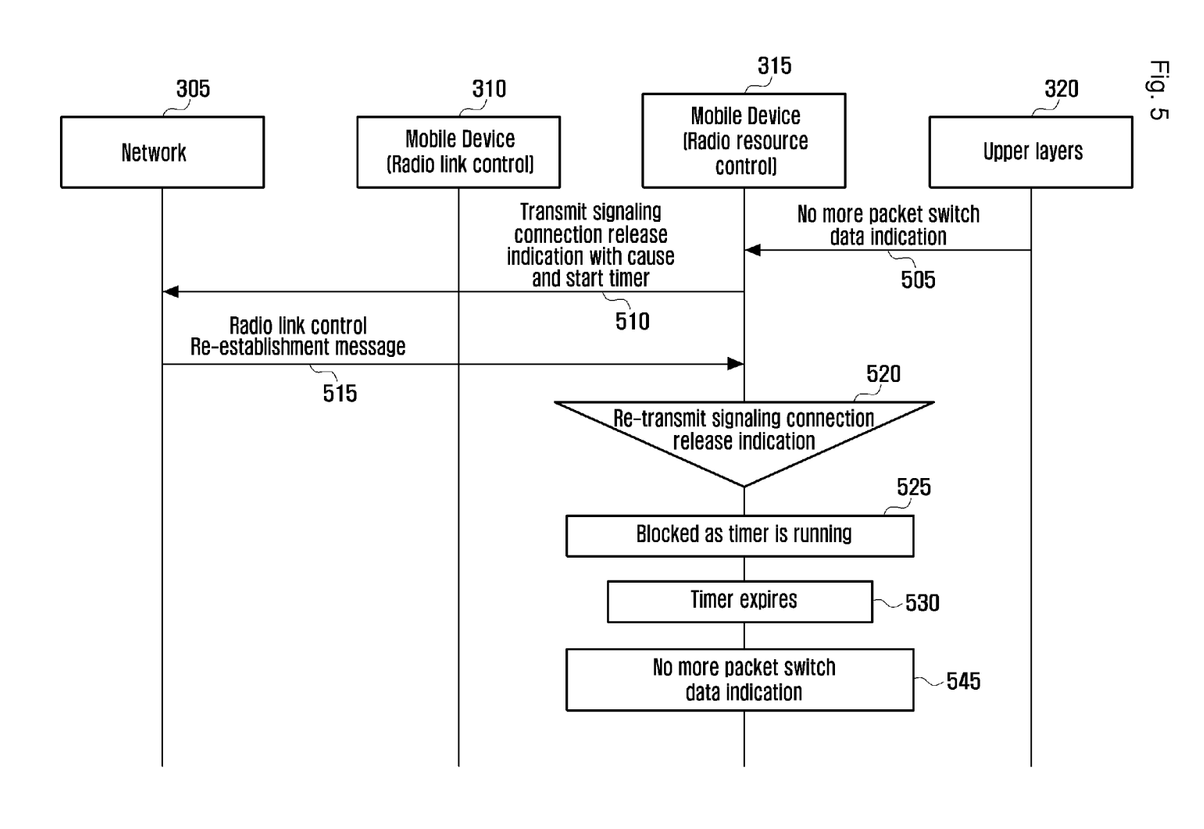
FIG. 5 illustrates interruption of a signalling connection release indication process due to radio link control (RLC) re-establishment procedure, in accordance with a prior art.

FIG. 5 illustrates interruption of a signalling connection release indication process due to radio link control (RLC) re-establishment procedure, in accordance with a prior art. Upper layers 320 transmit a no more packet switch (PS) data indication at step 505 to a radio resource control layer (RRC) 315 of a mobile device. The RRC 315 of the mobile device on reception of the indication, transmits an SCRI message with cause to a network 305, for example a universal mobile telecommunication system terrestrial radio access network (UTRAN), and starts a timer as shown in step 510. The mobile device makes a relocation from a first RNC to a second RNC. The UTRAN transmits a radio link control re-establishment message at step 515 to the RRC of the mobile device, to indicate the relocation to the mobile device. The RRC 315 of the mobile device retransmits the SCRI message as shown in step 520. The retransmission of the SCRI message by the RRC 315 of the mobile device is blocked as the timer is running as shown in step 525. In step 530, the timer expires or ceases to run. Even after the expiry of the timer, the RRC 315 of the mobile device cannot transmit the SCRI message as the RRC 315 of the mobile device does not receive the no more packet switch data indication at step 545 from the upper layers 320.

Figure 6:
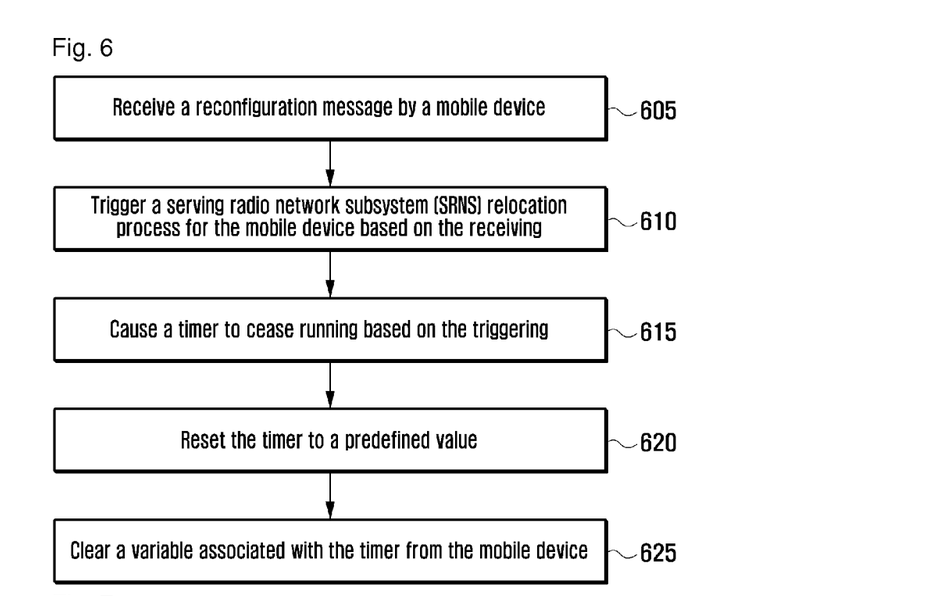
FIG. 6 is a flowchart illustrating a method of handling a signalling connection release indication (SCRI) process in a wireless communication system, in accordance with one embodiment.

FIG. 6 is a flowchart illustrating a method of handling a signalling connection release indication (SCRI) process in a wireless communication system, in accordance with one embodiment. At step 605, a reconfiguration message is received by a mobile device from a network, for example a universal mobile telecommunication system terrestrial radio access network (UTRAN). At step 610, the mobile device triggers a serving radio network subsystem relocation (SRNS) process based on the receiving. At step 615, a timer is caused to cease running based on the triggering. At step 620, the timer is reset to a predefined value. At step 625, a variable associated with the timer is cleared.

Figure 7:
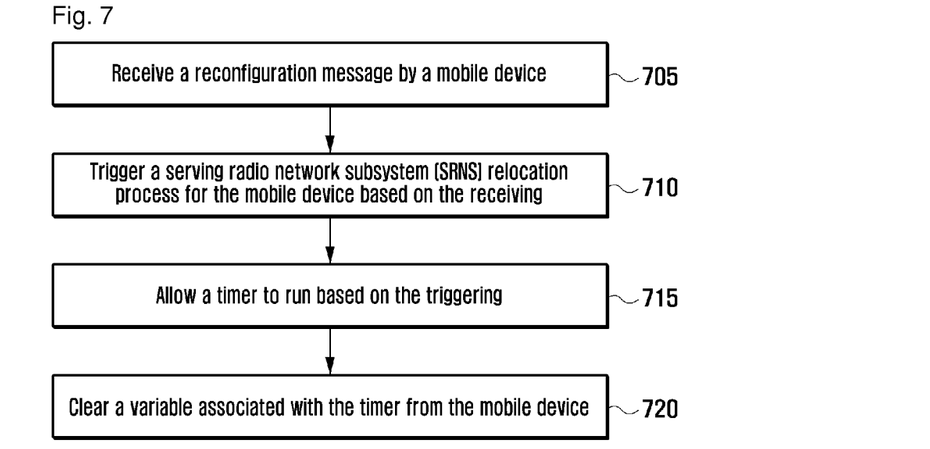
FIG. 7 is a flowchart illustrating a method of handling a signalling connection release indication process, in accordance with another embodiment.

FIG. 7 is a flowchart illustrating a method of handling a signalling connection release indication process, in accordance with another embodiment. At step 705, a mobile device receives a reconfiguration message from a universal mobile telecommunication system terrestrial radio access network (UTRAN). At step 710, the mobile device triggers a serving radio network subsystem relocation (SRNS) process. At step 715, a timer is allowed to start running. At step 720, a variable associated with the timer is cleared.

Figure 8:
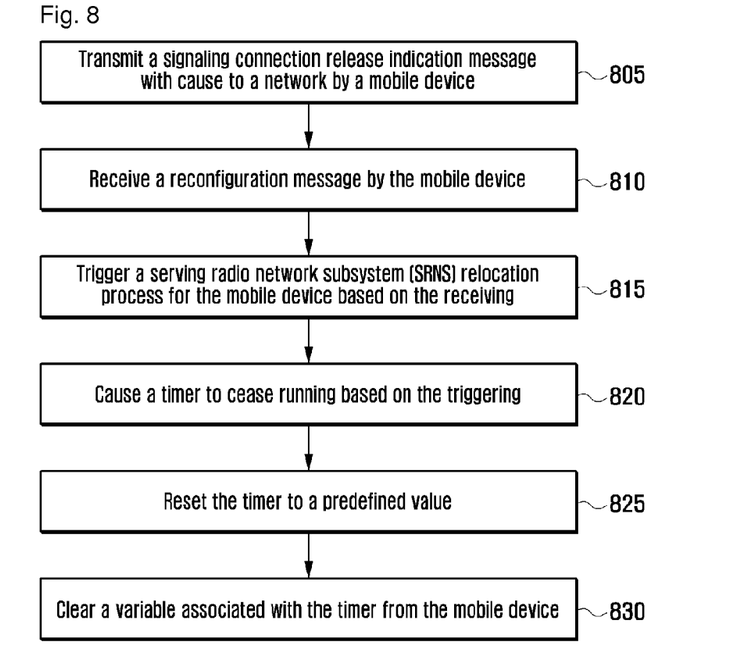
FIG. 8 is a flowchart illustrating a method of handling a signalling connection release indication process, in accordance with yet another embodiment.

FIG. 8 is a flowchart illustrating a method of handling a signalling connection release indication process, in accordance with yet another embodiment. At step 805, a mobile device transmits a signaling connection release indication with cause to a network, for example a UTRAN. At step 810, the mobile device receives a reconfiguration message from the UTRAN. At step 815, the mobile device triggers a serving radio network subsystem relocation (SRNS) process. At step 820, a timer is caused to cease running. At step 825, the timer is reset to a predefined value. At step 830, a variable associated with the timer is cleared from the mobile device.

Figure 9:
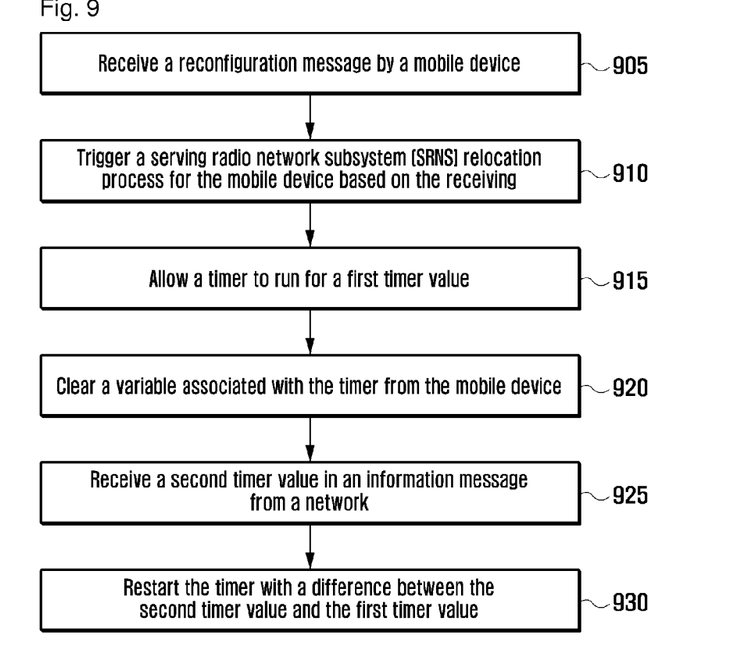
FIG. 9 is a flowchart illustrating a method of handling a signalling connection release indication process, in accordance with one another embodiment.

FIG. 9 is a flowchart illustrating a method of handling a signalling connection release indication process, in accordance with one another embodiment. At step 905, a mobile device receives a reconfiguration message. At step 910, the mobile device triggers a serving radio network subsystem relocation (SRNS) process. At step 915, a timer is allowed to start running for a first timer value. At step 920, a variable associated with the timer is cleared. At step 925, the mobile device receives a second timer value in an information message. At step 930, the timer is restarted with a difference between the second timer value and the first timer value.

Figure 10:
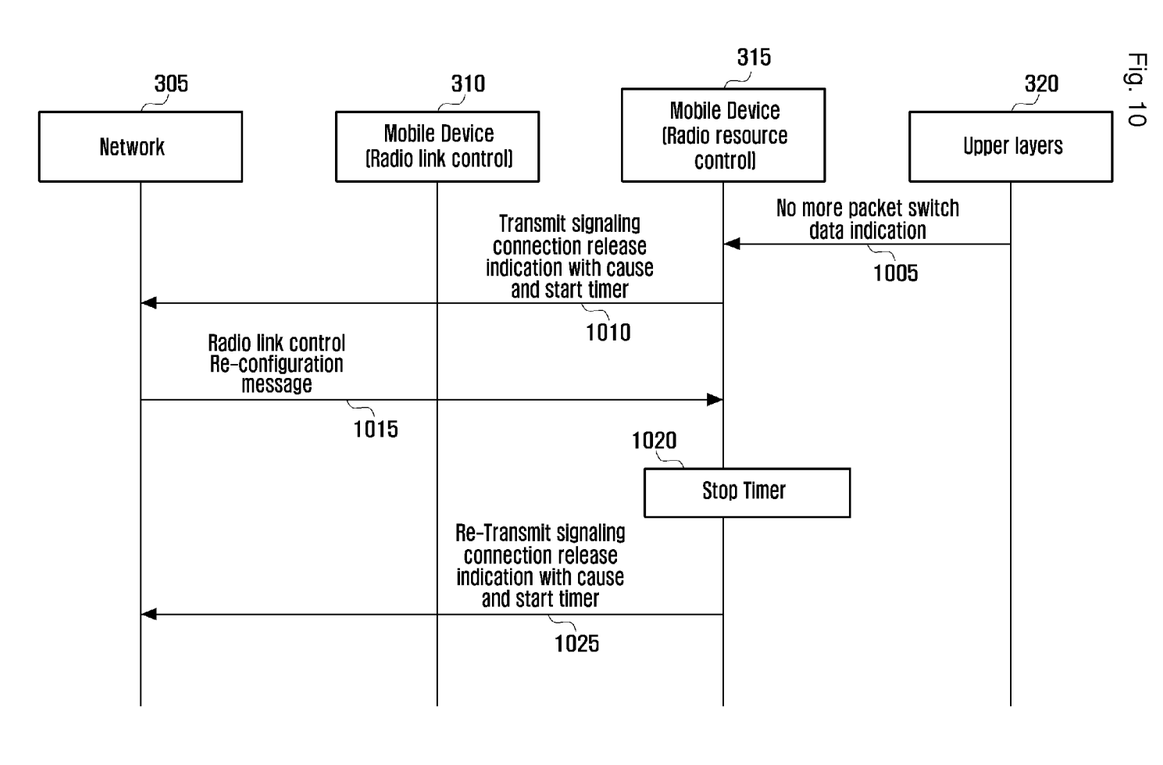
FIG. 10 illustrates handling a signalling connection release indication process, in accordance with one embodiment.

FIG. 10 illustrates handling a signalling connection release indication process, in accordance with one embodiment. Upper layers 320, transmits a no more packet switch (PS) data indication 1005 to a radio resource control layer (RRC) 315 of a mobile device. The RRC 315 of the mobile device on reception of the no more PS data indication 1005, transmits an SCRI message with cause to a universal mobile telecommunication system terrestrial radio access network (UTRAN) and starts a timer as shown in step 1010. The mobile device relocates from a first RNC to a second RNC. The UTRAN transmits a radio link control re-establishment message at step 1015 to the RRC 315 of the mobile device, to indicate the relocation to the mobile device. On reception of the radio link control re-establishment message by the RRC 315 of the mobile device, the timer is stopped as shown in step 1020. Once the timer is stopped, the RRC 315 of the mobile device retransmits the SCRI message with cause to the UTRAN as shown in step 1025.

Figure 11:
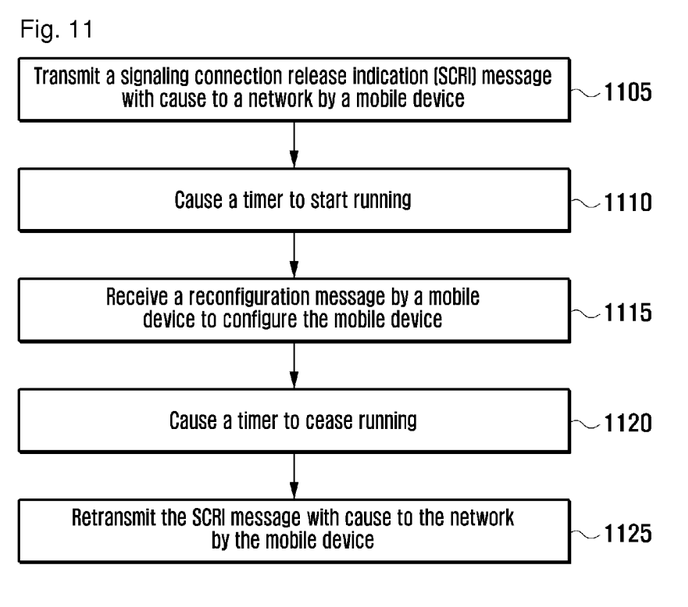
FIG. 11 is a flowchart illustrating a method of handling a signalling connection release indication process, in accordance with one embodiment.

FIG. 11 is a flowchart illustrating a method of handling a signalling connection release indication process, in accordance with one embodiment. At step 1105, a mobile device transmits a signaling connection release indication with cause to a universal mobile telecommunication system terrestrial radio access network (UTRAN). At step 1110, a timer is caused to start running. At step 1115, the mobile device receives a reconfiguration message from the UTRAN. At step 1120, a timer is caused to cease running. At step 1125, the mobile device retransmits the signaling control release indication message with cause to the UTRAN.

Figure 12:
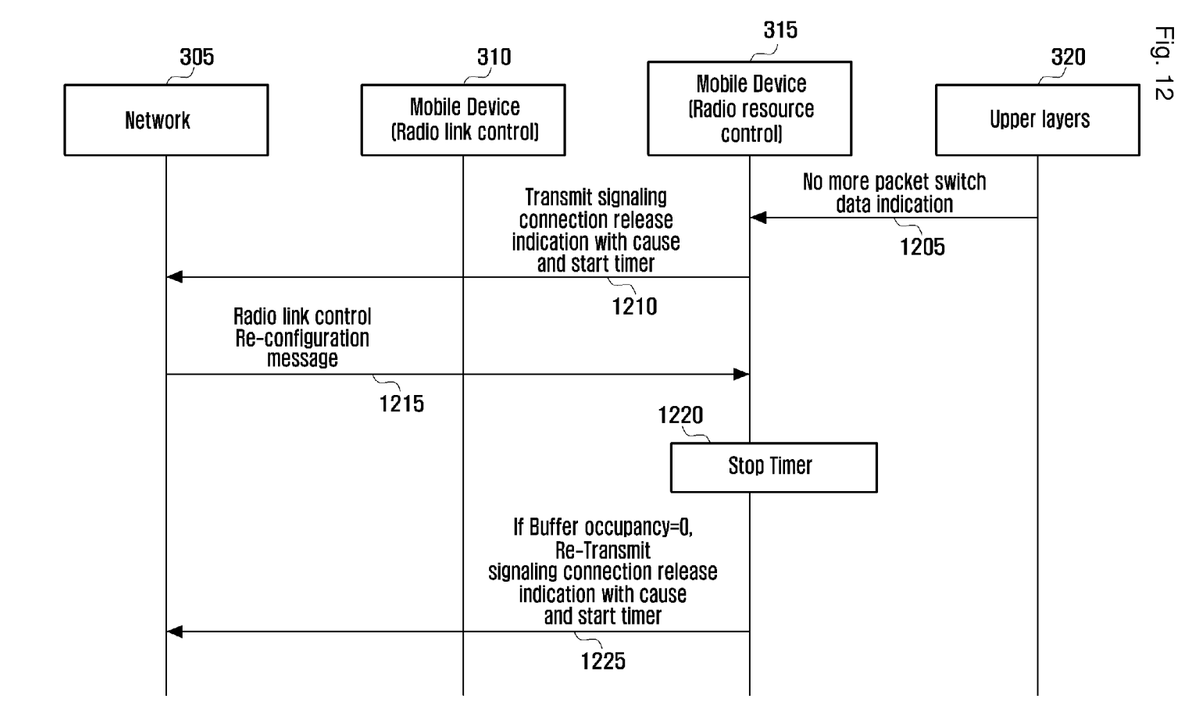
FIG. 12 illustrates handling a signalling connection release indication process, in accordance with another embodiment.

FIG. 12 illustrates handling a signalling connection release indication process, in accordance with another embodiment. Upper layers 320 transmits a no more packet switch (PS) data indication 1205 to a radio resource control layer (RRC) 315 of a mobile device. The RRC 315 of the mobile device on reception of the no more PS data indication, transmits an SCRI message with cause to a universal mobile telecommunication system terrestrial radio access network (UTRAN) and starts a timer as shown in step 1210. The mobile device relocates from a first RNC to a second RNC. The UTRAN transmits a radio link control re-establishment message 1215 to the RRC 315 of the mobile device, to indicate the relocation to the mobile device. On reception of the radio link control re-establishment message 1215 by the RRC of the mobile device, the timer is stopped as shown in step 1220. The RRC 315 of the mobile device checks for the buffer occupancy (BO). The BO indicates if PS data for transmission is present. If the BO is zero, the RRC 315 of the mobile device retransmits the SCRI message with cause to the UTRAN. The BO at zero indicates to the mobile device that there is no PS data for transmission.

Figure 13:
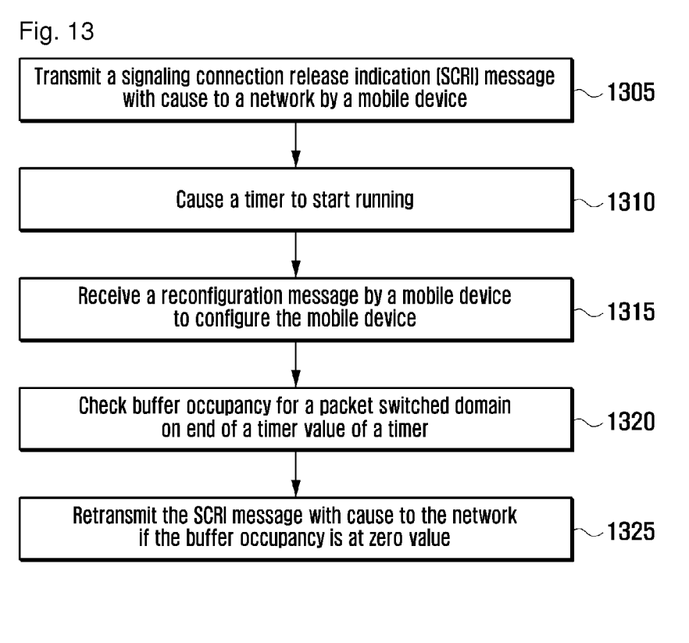
FIG. 13 is a flowchart illustrating a method of handling a signalling connection release indication process, in accordance with another embodiment.

FIG. 13 is a flowchart illustrating a method of handling a signalling connection release indication process, in accordance with another embodiment. At step 1305, a mobile device transmits a signaling connection release indication with cause to a universal mobile telecommunication system terrestrial radio access network (UTRAN). At step 1310, a timer is caused to start running. At step 1315, the mobile device receives a reconfiguration message from the UTRAN to configure the mobile device. At step 1320, the mobile device checks if buffer occupancy is zero for a packet switched domain on end of a timer value of a timer. At step 1325, the mobile device retransmits signaling control release indication message with cause to the UTRAN.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of the present disclosure.

The invention claimed is:

1. A method of handling a signaling connection release process in a wireless communication system, the method comprising:
   starting a timer if an upper layer indicates there is no more packet switched (PS) data;
   receiving a reconfiguration message from a network; and
   stopping and resetting the timer inhibiting a mobile device from transmitting a signaling connection release indication message while the timer is running and clearing any value associated with the timer if the received reconfiguration message is for radio bearer reconfiguration.

2. The method of claim 1, wherein the mobile device relocates from a first radio network controller (RNC) to a second RNC if the mobile device receives the reconfiguration message.

3. The method of claim 1, further comprising:
   triggering a serving radio network subsystem (SRNS) relocation process for the mobile device based on the receiving of the reconfiguration message.

4. The method of claim 1, further comprising:
transmitting a signaling connection release indication (SCRI) message with cause to the network by the mobile device.

5. The method of claim 1, further comprising:
retransmitting a signaling connection release indication (SCRI) message with cause to the network by the mobile device.

6. The method of claim 3, wherein the SRNS relocation process comprises checking an integrity protection mode information parameter in the reconfiguration message.

7. The method of claim 6, wherein the integrity protection mode information parameter is present in the reconfiguration message if a Universal Mobile Telecommunications System Terrestrial Radio Access Network (UTRAN) performs the SRNS relocation process.

8. The method of claim 3, wherein the SRNS relocation process comprises checking a UTRAN radio network temporary identifier (U-RNTI) parameter in the reconfiguration message.

9. The method of claim 8, wherein the U-RNTI parameter received in the reconfiguration message is different from a U-RNTI parameter stored in the mobile device.

10. The method of claim 9, wherein the U-RNTI parameter is present in the reconfiguration message if the UTRAN performs the SRNS relocation process.

11. The method of claim 3, wherein the SRNS relocation process comprises checking a downlink counter synchronization information parameter in the reconfiguration message.

12. The method of claim 11, wherein the downlink counter synchronization information parameter is present in the reconfiguration message if the UTRAN performs the SRNS relocation process.

13. The method of claim 4, wherein the mobile device transmits the SCRI message with cause to the network if the network when supports fast dormancy.

14. The method of claim 13, wherein the timer is ceased and reset if the mobile device receives unsuccessful delivery of the SCRI message with cause.

15. A method of handling a signaling connection release process in a wireless communication system, the method comprising:
receiving a reconfiguration message by a mobile device, wherein the mobile device relocates from a first radio network controller (RNC) to a second RNC;
triggering a serving radio network subsystem (SRNS) relocation process for the mobile device based on the receiving;
allowing a timer to run, wherein the timer is run for a first timer value;
clearing a variable associated with the timer from the mobile device;
receiving a second timer value in an information message from a network;
restarting the timer with a difference between the second timer value and the first timer value.

16. The method of claim 15, wherein the variable associated with the timer is cleared from a timers and constants variable in the mobile device.

17. The method of claim 16, wherein the SRNS relocation process comprises checking an RNC support for change of mobile device capability parameter that is present in the reconfiguration message.

18. The method of claim 17, wherein a signaling connection release indication (SCRI) message is retransmitted by ceasing running of the timer.

19. The method of claim 18, wherein the timer is restarted once the SCRI message is retransmitted.

20. A method of handling a signaling connection release process in a wireless communication system, the method comprising:
transmitting a signaling connection release indication (SCRI) message with cause to a network by a mobile device;
causing a timer to start running;
receiving a reconfiguration message by the mobile device to configure the mobile device, wherein the mobile device relocates from a first radio network controller (RNC) to a second RNC;
checking buffer occupancy for a packet switched domain on end of a timer value of a timer; and
retransmitting the SCRI message with cause to the network if the buffer occupancy is at zero value.

21. A mobile device for handling a signaling connection release process in a wireless communication system, the mobile device comprising:
a controller configured to start a timer if an upper layer indicates there is no more packet switched (PS) data, to receive a reconfiguration message from a network, and to stop and reset a timer inhibiting the mobile device from transmitting a signaling connection release message while the timer is running and clear any value associated with the timer if the received reconfiguration message is for radio bearer reconfiguration.

22. The mobile device of claim 21, wherein the mobile device further comprises
a radio link controller to retransmit a signaling connection release indication (SCRI) message with cause to the network.

23. The mobile device of claim 21, wherein the controller is configured to receive a timer value in an information message from the network, and to restart the timer with another timer value.

24. The mobile device of claim 21, wherein the controller is configured to transmit a signaling connection release indication (SCRI) message with cause to the network.

25. The mobile device of claim 21, wherein the controller is configured to trigger a serving radio network subsystem (SRNS) relocation process for the mobile device based on the receiving of the reconfiguration message.

26. The mobile device of claim 25, wherein the SRNS relocation process comprises checking an integrity protection mode information parameter in the reconfiguration message.

27. The mobile device of claim 26, wherein the integrity protection mode information parameter is present in the reconfiguration message if a Universal Mobile Telecommunications System Terrestrial Radio Access Network (UTRAN) performs the SRNS relocation process.

28. The mobile device of claim 25, wherein the SRNS relocation process comprises checking a UTRAN radio network temporary identifier (U-RNTI) parameter in the reconfiguration message.

29. The mobile device of claim 28, wherein the U-RNTI parameter received in the reconfiguration message is different from a U-RNTI parameter stored in the mobile device.

30. The mobile device of claim 29, wherein the U-RNTI parameter is present in the reconfiguration message if the UTRAN performs the SRNS relocation process.

31. The mobile device of claim 25, wherein the SRNS relocation process comprises checking a downlink counter synchronization information parameter in the reconfiguration message.

32. The method of claim 31, wherein the downlink counter synchronization information parameter is present in the reconfiguration message if the UTRAN performs the SRNS relocation process.

* * * * *